United States Patent [19]

Koike

[11] Patent Number: 4,638,475

[45] Date of Patent: Jan. 20, 1987

[54] ROUTER UNIT AND ROUTING NETWORK FOR DETERMINING AN OUTPUT PORT BY DETECTING A PART OF AN INPUT PACKET

[75] Inventor: Nobuhiko Koike, Tokyo, Japan

[73] Assignee: NEC Corporation, Tokyo, Japan

[21] Appl. No.: 506,264

[22] Filed: Jun. 21, 1983

[30] Foreign Application Priority Data

Jun. 21, 1982 [JP] Japan .................................. 57-106453
Jun. 21, 1982 [JP] Japan .................................. 57-106454

[51] Int. Cl.$^4$ ............................................. H04Q 11/04
[52] U.S. Cl. .................................. 370/60; 340/825.52
[58] Field of Search ............... 370/60, 94; 340/825.52, 340/825.53

[56] References Cited

U.S. PATENT DOCUMENTS

| | | | |
|---|---|---|---|
| 4,081,612 | 3/1978 | Hafner | 370/60 |
| 4,335,456 | 6/1982 | Gaiser et al. | 370/60 |
| 4,475,188 | 10/1984 | Wilson et al. | 370/60 |
| 4,510,493 | 4/1985 | Bux et al. | 340/825.52 |

Primary Examiner—Robert L. Griffin
Assistant Examiner—Frank M. Scutch, III

Attorney, Agent, or Firm—Sughrue, Mion, Zinn, Macpeak & Seas

[57] ABSTRACT

In a router unit (20) for use in supplying an input packet (PI) from an input port (I) to an output port (O) with reference to a destination bit series included in the input packet, each input buffer (22) divides the destination bit series into a plurality of partial bit series specified by series positions. A predetermined one of the series positions is assigned to the router unit and is represented by a position signal (PS) to select the partial bit series from the predetermined series position. An output buffer (46) is determined in consideration of the selected partial bit series and is loaded with the input packet. The input packet is sent from the output buffer to the output port as an output packet (PO) to protect the input packet from conflicting with another input packet at the output port. A plurality of the router units may be included in a plurality of stages each of which is given the position signal different from that of the other stages. Alternatively, each router unit may comrise a plurality of code substitution circuit for substituting an input port code for the specified partial bit series to specify an originating input port.

6 Claims, 13 Drawing Figures

ROUTER UNIT AND ROUTING NETWORK FOR DETERMINING AN OUTPUT PORT BY DETECTING A PART OF AN INPUT PACKET

BACKGROUND OF THE INVENTION

This invention relates to a router unit and a routing network for use as a transmission network in an electronic computer system.

An electronic computer system often has a plurality of processors and is put into operation as a multiprocessor system. Such a multiprocessor system is helpful to improve performance and throughput of the electronic computer system.

With the multiprocessor system, each processor partially takes charge of work to be processed and is operable in relation to the other processors. Data transmission is necessary between the processors through a transmission network arranged therebetween. The performance of the electronic computer system is therefore dependent on that of the transmission network.

A conventional transmission network is put into operation in a manner similar to a crossbar exchange system and is convenient because each processor can be connected through the transmission network to another processor. With an increase of the processors in number, the number of circuit elements necessary for the transmission network should inevitably be augmented in the order of $N^2$ where N represents the number of the processors. The conventional transmission network therefore becomes expensive with the increase of the number N of the processors.

According to a technical paper contributed by Jack B. Dennis et al to SIGARCH Newsletter Volume 8, Number 3, pp. 1-8, for the seventh annual symposium held during May 6-8, 1980 under the title of "Building Blocks for Data Flow Prototypes," a routing network system is proposed as another conventional transmission system for transmitting each packet from an input port to an output port. Such a routing network comprises a plurality of router units arranged into a plurality of stages comprising a preceding stage and the succeeding stage following the preceding stage and therefore may be called a multistage network system. With the multistage network system, it is possible to accomplish performance equivalent to that of the crossbar exchange system. In addition, costs rise up only in the order of (N log N) even when the number N of the processors is increased. The multistage network system is therefore economical as compared with the before-described conventional routing network system.

However, conflicts or collisions unavoidably take place when a plurality of the processors concurrently transmit the packets to an identical processor through the multistage network system. The performance is seriously reduced on occurrence of the conflicts.

Furthermore, each router unit should be different in structure from the other router unit at every stage of the multistage network system because different operation must be carried out at every stage. In other words, each router unit is not interchangeable with one another.

It is preferable that each router unit of the succeeding stage can recognize each input port of the stage situated prior to the succeeding stage.

SUMMARY OF THE INVENTION

It is an object of this invention to provide a router unit which is applicable to a multistage network system and which is usable in common to each stage of the multistage network system.

It is another object of this invention to provide a router unit of the type described, which is capable of avoiding conflicts when two or more of processors concurrently transmit packets to a single processor.

It is a further object of this invention to provide a router unit of the type described, which is capable of recognizing each input port.

It is a yet further object of this invention to provide a routing network which is capable of effectively carrying out transmission of packets.

A router unit to which this invention is applicable is responsive to a plurality of input packets supplied through a plurality of input ports, respectively, for distributing the input packets to at least one output port as output packets. Each of the input packets includes a destination bit series representative of a destination and divisible into a plurality of partial bit series placed at bit series positions, respectively.

According to this invention, the router unit comprises first means for producing a position signal indicative of a predetermined one of the bit series positions that is preassigned to the router unit, a plurality of second means responsive to the respective input packets and to the position signal for selecting predetermined ones of the partial bit series from the predetermined positions, respectively, and third means coupled to the respective second means and responsive to the respective input ports for delivering the input packets to the output ports as the output packets with reference to the predetermined partial bit series, respectively.

DESCRIPTION OF THE PREFERRED EMBODIMENTS

Figure 1:
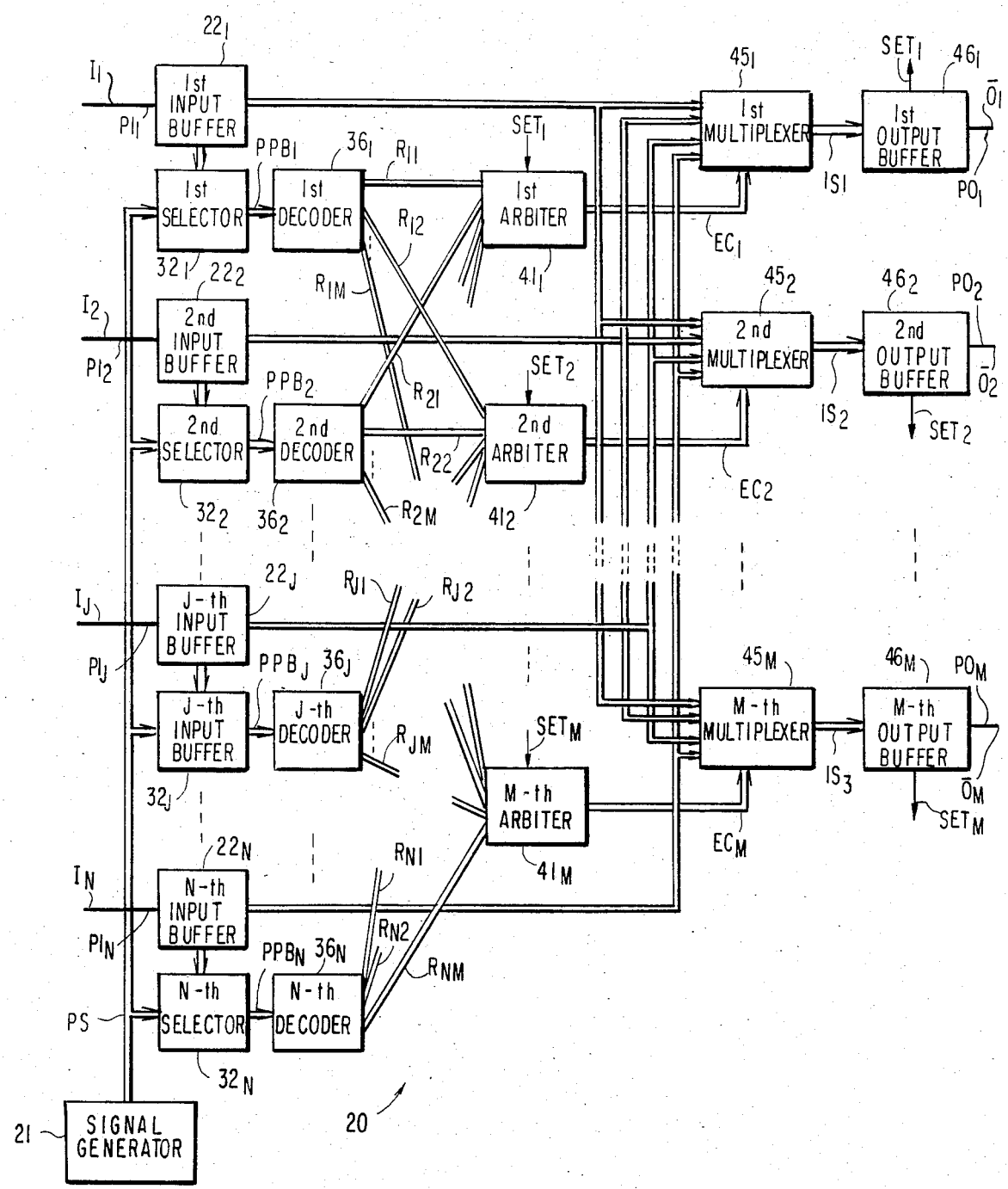
FIG. 1 shows a block diagram of a router unit according to a first embodiment of this invention.

Referring to FIG. 1, a router unit 20 according to a first embodiment of this invention is for use in a multi-stage network system which will later be described and comprises a plurality of stages to be operable in response to first through N-th input packets PI. The first through the N-th input packets will be denoted by $PI_1$, $PI_2, \ldots, PI_J, \ldots,$ and $PI_N$. The input packets PI are supplied through first through N-th input ports $I_1$ to $I_N$ (symbolized by thick lines on the leftmost side of FIG. 1), respectively. The router unit 20 distributes each of the input packets PI as each of output packets PO to one of first through M-th output ports $0_1$ to $0_M$. The output packets PO on the output ports $0_1$ to $0_M$ will be designated by $PO_1$ to $PO_M$, respectively. The number M may be equal to or more than unity. Each of the input and the output ports may be a shift register.

Each input packet PI includes a destination bit series representative of a destination to which each input packet is to be delivered. The destination bit series is divisible into a plurality of partial bit series which can be specified by bit series positions, respectively. Each partial bit series may be of a single bit. Each input packet PI comprises a data series which follow the destination bit series.

The router unit 20 comprises a signal generator 21 for producing a position signal PS indicative of a predetermined one of the bit series positions that is preassigned to the router unit 20. The position signal PS may be produced by selecting one of a plurality of built-in terminals attached to the router unit 20. The selected one of the built-in terminals may be, for example, grounded and is determined in consideration of each stage which comprises the illustrated router unit 20.

The first through the N-th input packets $PI_1$ to $PI_N$ are memorized in first through N-th input buffer $22_1$ to $22_N$, respectively. By way of example, description will be made as regards the J-th input buffer $22_J$ and is similarly applied to any other input buffers without modification.

Figure 2:
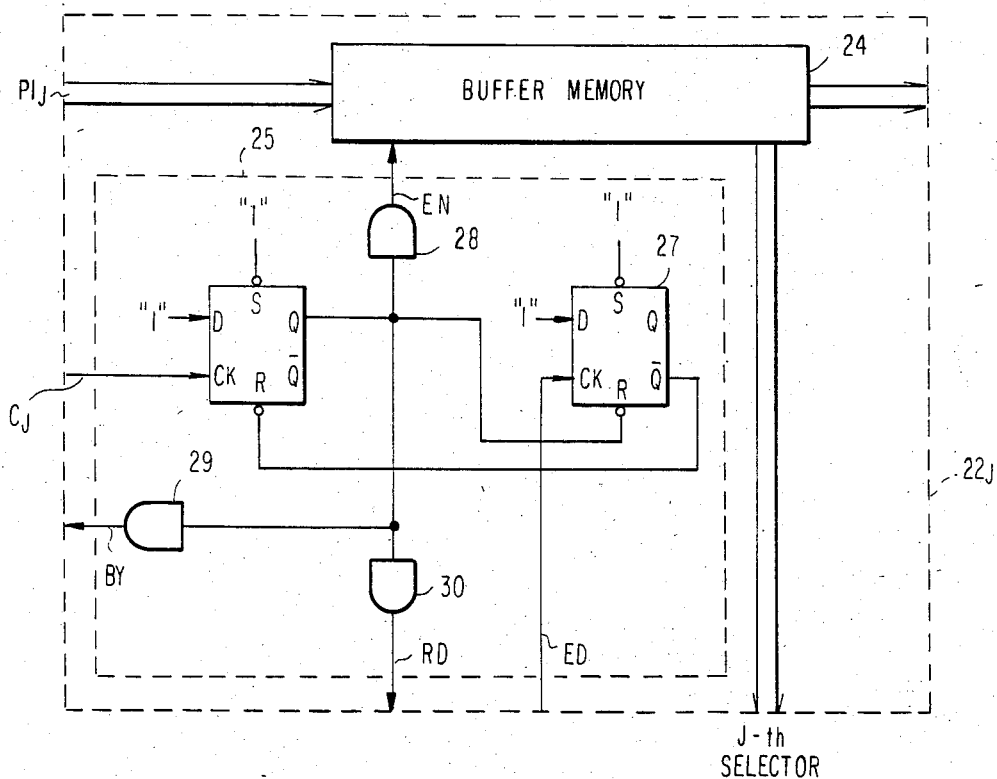
FIG. 2 shows a block diagram of an input buffer for use in the router unit illustrated in FIG. 1.
Figure 3:
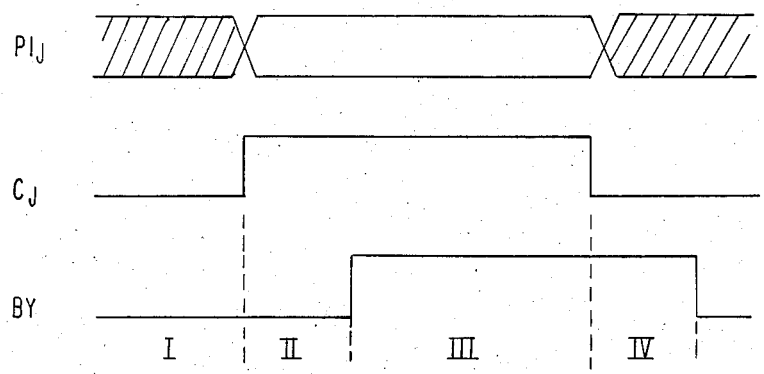
FIG. 3 shows a time chart for use in describing operation of the input buffer illustrated in FIG. 2.

Referring to FIGS. 2 and 3 together with FIG. 1, the J-th input buffer $22_J$ is supplied with the J-th input packet $PI_J$ and a J-th transmission control pulse $C_J$ through the J-th input port $I_J$. The J-th transmission control signal $C_J$ is sent from a stage preceding the illustrated router unit 20, together with the J-th input packet $PI_J$. In FIG. 3, the J-th input packet $PI_J$ is not received by the J-th input buffer $22_J$ during absence of the J-th transmission control pulse $C_J$. Therefore, the J-th input buffer $22_J$ is disabled during a first duration I. The illustrated J-th transmission control pulse $C_J$ last a second duration II and a third duration III. Therefore, the J-th input packet $PI_J$ is received by the J-th input buffer $22_J$ the second and the third durations II and III.

In FIG. 2, the J-th input buffer $22_J$ comprises a buffer memory 24 and a buffer control circuit 25 comprising, in turn, first and second D-type flip flops (will simply be abbreviated to F/F) 26 and 27. Each of F/F's has terminals D, CK, S, R, Q, and $\overline{Q}$ all of which are known in the art. Each terminal D of the first and the second F/F's 26 and 27 is put in a logic "1" level, as shown in FIG. 2. The terminal Q of the first F/F 26 is connected to the terminal R of the second F/F 27 while the terminal $\overline{Q}$ of the second F/F 27, to the terminal R of the first F/F 26. In an initial state, the terminal R of the second F/F 27 is kept in the logic "0" level and is therefore locked in a reset state. The terminal R of the first F/F 26 is kept in the logic "1" level and is unlocked. The first F/F 26 is therefore operable in response to the J-th transmission control pulse although the first F/F 26 is reset in the initial state.

Under the circumstances when the J-th transmission control pulse $C_J$ is given to the terminal CK of the first F/F 26, the logic "1" level appears at the terminal Q of the first F/F 26. As a result, the second F/F 27 is unlocked from the reset state. Simultaneously, the logic "1" level is delivered through a first AND gate 28 to the buffer memory 24 as a memory enable signal EN. Responsive to the memory enable signal EN, the buffer memory 24 memorizes the J-th input packet $PI_J$ and successively produces the same. Likewise, the logic "1" level is sent from the first F/F 26 through a second AND gate 29 as a busy signal BY to the J-th input port and is produced through a second AND gate 30 as a ready signal RD to be described later. The busy signal BY is supplied through the J-th input port $I_J$ to the preceding stage.

When the J-th input packet $PI_J$ is delivered towards the output ports $0_1$ to $0_M$ in a manner to be described, an end signal ED is given to the terminal CK of the second F/F 27 to put the second F/F 27 into a set state. In this event, the logic "0" level is sent from the terminal $\overline{Q}$ of the second F/F 27 to the terminal R of the first F/F 26. Supplied with the logic "0" level to the terminal R of the first F/F 26, the first F/F 26 is put into the reset state. As a result, the second F/F 27 is also put in the reset state because the logic "0" level is given from the terminal Q of the first F/F 26 to the terminal R of the second F/F 27. When the second F/F 27 is put into the reset state, the logic "1" level is supplied from the terminal $\overline{Q}$ of the second F/F 27 to the terminal R of the first F/F 26. Thus, the buffer control circuit 25 is returned back to the initial state. At the same time, each of the memory enable signal EN and the ready signal RD is given the logic "0" level. The bus signal BY is also given the logic "0" level as shown in FIG. 3 and disappears a fourth duration IV. The J-th input buffer $22_J$ can receive the next following input packet.

Figure 4:
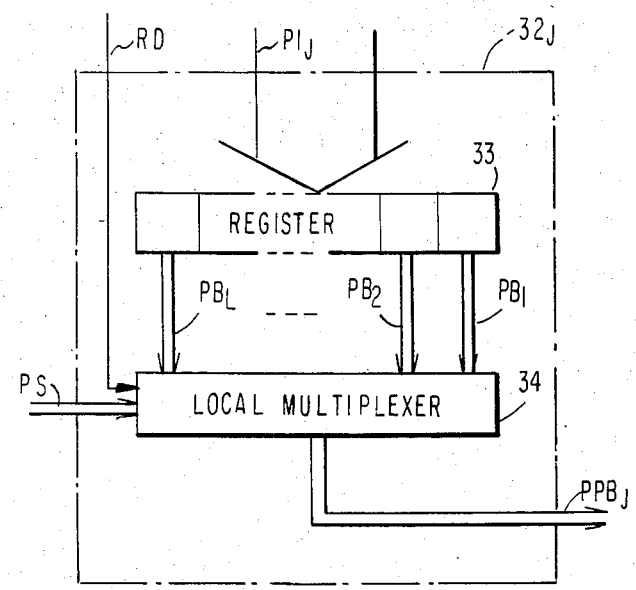
FIG. 4 shows a block diagram of a selector for use in the router unit illustrated in FIG. 1.

Referring to FIG. 4 together with FIG. 1, the first through the N-th input buffers $22_1$ to $22_N$ transfer the first through the N-th input packets $PI_1$–$PI_N$ to first through N-th selectors $32_1$ to $32_N$, respectively. The J-th selector $32_J$ exemplified in FIG. 4 comprises a register 33 supplied with the J-th input packet $PI_J$ through the J-th buffer memory 24 (FIG. 4). The register 33 may keep only the destination bit series included in the J-th input packet $PI_J$ and divides the destination bit series into first through L-th partial bit series $PB_1, PB_2, \ldots, PB_L$. As pointed out hereinabove, each of the partial bit series may be of a single bit.

The first through the L-th partial bit series are sent from the register 33 to a local multiplexer 34 operable in response to the ready signal RD (FIG. 2) and the position signal PS described in conjunction with FIG. 1. The local multiplexer 34 selects a predetermined one of the partial bit series $PB_1$ to $PB_L$ with reference to the position signal PS to produce the predetermined partial bit series $PPB_J$. Similar operation is carried out in any other selectors to derive predetermined partial bit series $PB_1$ to $PPB_N$ except $PPB_J$.

Thus, each of the selectors 32 (suffixes omitted) cooperates with each of the input buffers 22 in order to select each of the predetermined partial bit series PPB.

Figure 5:
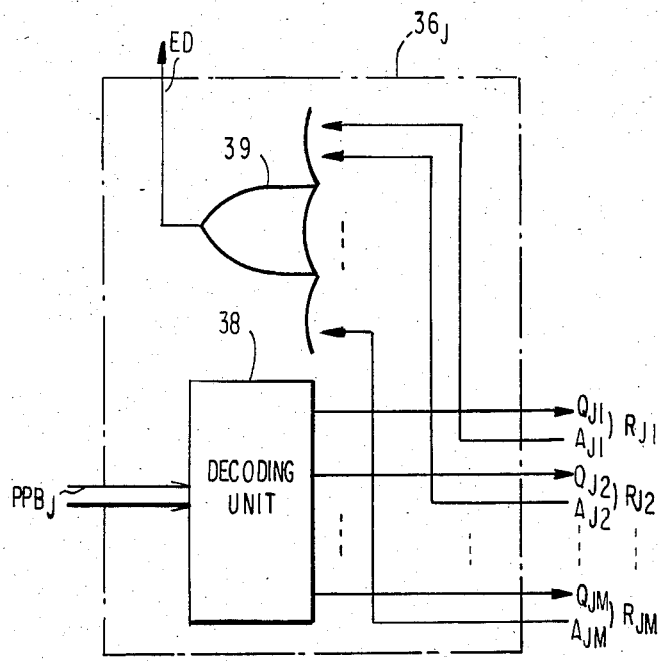
FIG. 5 shows a block diagram of a decoder for use in the router unit.

Referring to FIG. 5 afresh and to FIG. 1 again, the predetermined partial bit series PPB are supplied from the selectors 32 to first through N-th decoders $36_1$ to $36_N$, respectively. In FIG. 5, the J-th decoder $36_J$ comprises a decoding unit 38 supplied with the predetermined partial bit series $PPB_J$. The decoding unit 38 selects one of the first through the M-th output ports that is indicated by the destination bit series. For this purpose, first through M-th request signal lines are extended from the decoding unit 38 for the respective output ports to send first through M-th request signals $Q_{J1}$ to $Q_{JM}$ towards the respective output ports. Each of the first through the M-th request signals $Q_{J1}$ to $Q_{JM}$ is selectively produced from the decoding unit 38 and may be referred to as an output port signal specifying each output port.

First through M-th acknowledgement signals $A_{J1}$ and $A_{JM}$ are sent to the J-th decoder $36_J$ through first to M-th acknowledgement signal lines from output port side in a manner to be described later, respectively. Each acknowledgement signal is given to the decoder $36_J$ when the J-th input packet is delivered to any one of the first through the M-th output ports. Each of the first through the M-th acknowledgement signals $A_{J1}$ to $A_{JM}$ is supplied to an OR gate 39 to be transferred as the end signal ED to the second F/F 27 (FIG. 2). The respective acknowledgement signals $A_{J1}$ to $A_{JM}$ and the corresponding request signals $Q_{J1}$ to $Q_{JM}$ are used in pairs on carrying out transmission between the decoder $36_J$ and the first to the M-th output ports. Signal pairs of the acknowledgement signals $A_{J1}$ to $A_{JM}$ and the corresponding request signals $Q_{J1}$ to $Q_{JM}$ are transmitted through signal lines $R_{J1}$ to $R_{JM}$, respectively.

Referring back to FIG. 1, each of the first through the N-th decoders $36_1$ to $36_J$ is connected to first through M-th arbiters $41_1, 41_2, \ldots, 41_M$ through the signal lines $R_{11}, R_{12}, \ldots, R_{1M}; R_{21}, R_{22}, \ldots, R_{2M}; \ldots; R_{J1}, R_{J2}, \ldots, R_{JM}; \ldots;$ and $R_{N1}, R_{N2}, \ldots, R_{NM}$. As a result, each of the arbiters $41_1, 41_2, \ldots, 41_M$ is operable in response to the request signals equal in number to N.

Figure 6:
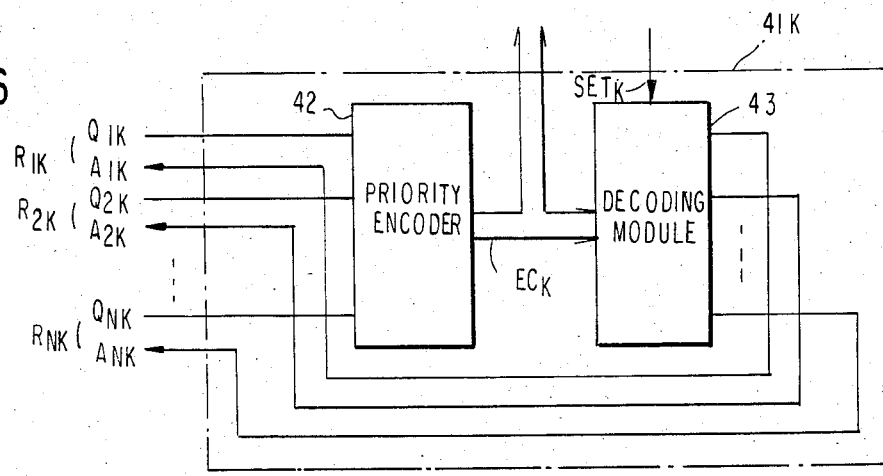
FIG. 6 shows a block diagram of an arbiter for use in the router unit.

Temporarily referring to FIG. 6, a K-th arbiter $41_K$ is representative of the first through the M-th arbiters $41_1$ to $41_M$ and is connected to the first through the N-th decoders $36_1$ to $36_N$ through the signal lines $R_{1K}, R_{2K}, \ldots, R_{NK}$. The K-th arbiter $41_K$ comprises a priority encoder 42 for selecting the request signals $Q_{1K}$ to $Q_{NK}$ to produce an encoder output signal $EC_K$. The priority encoder 42 gives a priority to the request signals in a preselected order when a plurality of the request signals are concurrently received at the priority encoder 42. At any rate, one of the request signals $Q_{1K}$ to $Q_{NK}$ is allowed to pass through the K-th arbiter $41_K$ as the encoder output signal $EC_K$. The encoder output signal $EC_K$ may be called an allowed request signal. Such a priority encoder 42 can be implemented in a known manner. The priority encoder 42 may select each request signal in the order of occurrence of the request signals, unless a plurality of the request signals are concurrently received by the priority encoder 42.

The encoder output signal $EC_K$ is delivered to a decoding module 43 and towards the output port corresponding to the K-th arbiter $41_K$, as will presently become clear. The decoding module 43 decodes the encoder output signal $EC_K$ into one of the acknowledgement signals $A_{1K}, A_{2K}, \ldots, A_{NK}$ in response to a set signal SET supplied from the corresponding output port when the input packet is set in the corresponding output port.

Let the one acknowledgement signal be supplied from the K-th arbiter $41_K$ to the J-th decoder $36_J$ illustrated with reference to FIG. 5. In this event, the J-th decoder $36_J$ sends the end signal ED to the J-th input buffer $22_J$ illustrated in FIG. 2. Thus, the input buffer $22_J$ is put into the initial state for receiving the following input packet.

Further referring to FIG. 1, the first through the M-th arbiters $41_1$ to $41_M$ supply first through M-th multiplexers $45_1$ to $45_M$ with first through M-th encoder output signals $EC_1$ to $EC_M$ in a manner similar to that illustrated in conjunction with FIG. 6, respectively. Each of the first through the M-th multiplexers $45_1$ to $45_M$ is supplied with the first through the N-th input packets $PI_1$ to $PI_N$ through the input buffers $22_1$ to $22_N$.

Each multiplexer $45_1$ to $45_M$ selects one of the input packets with reference to each of the first through the M-th encoder output signals $EC_1$ through $EC_M$. The first through the M-th multiplexers $45_1$ to $45_M$ are connected to first through M-th output buffers $46_1$ to $46_M$, respectively. Each selected input packet is sent from the multiplexer to the corresponding output buffer. Thus, the first through the M-th multiplexers $45_1$ to $45_M$ produce first through M-th selected input packets $PI_{S1}$ to $PI_{SM}$, respectively.

Figure 7:
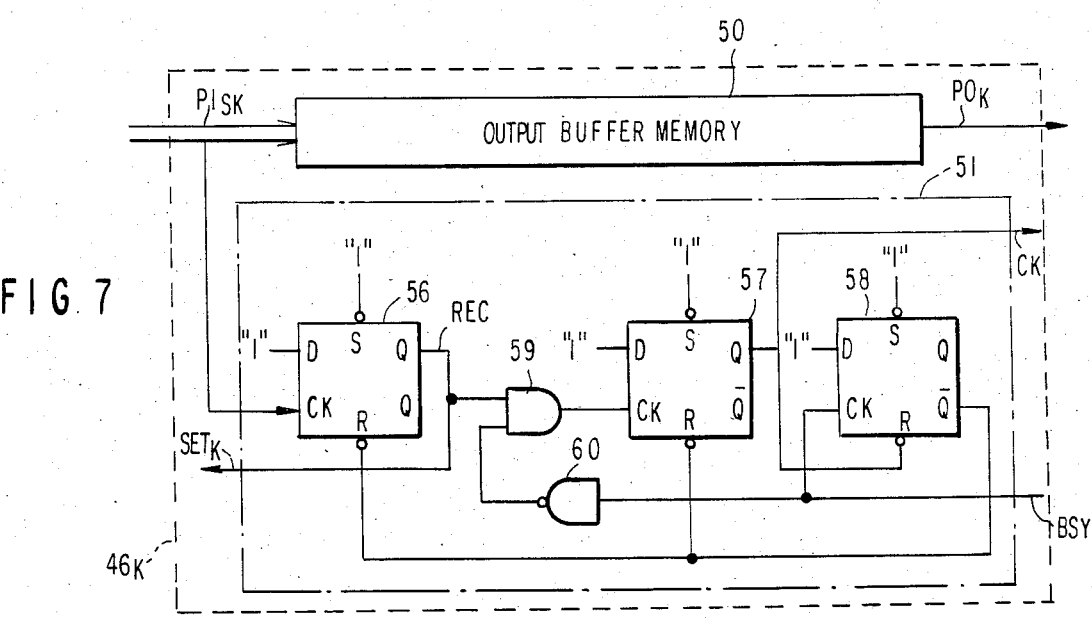
FIG. 7 shows a block diagram of an output buffer for use in the router unit.

Referring to FIG. 7, a K-th output buffer $46_K$ is representative of the first through the M-th output buffers $46_1$ to $46_M$ and is operable in response to a K-th one $PI_{SK}$ of the selected input packets. The output buffer $46_K$ comprises an output buffer memory 50 for storing the K-th selected input packet $PI_{SK}$ and an output control circuit 51 for supplying the K-th input packet to a K-th output port $0_K$ as a K-th output packet $PO_K$.

The K-th selected input packet $PI_{SK}$ is also supplied to the output control circuit 51. A busy signal BSY is supplied from the succeeding router unit to the output control circuit 51 to indicate a busy state of the succeeding router unit. The busy signal BSY takes the logic "1" level during the busy state and otherwise the logic "0" level. Let the busy signal BSY take the logic "0" level.

The output control circuit 51 comprises first, second, and third D type flip flops 56, 57, and 58 which will be abbreviated to first, second, and third F/F's, respectively, and each of which has terminals S, R, D, CK, Q, and $\overline{Q}$. The terminals S and D of each F/F are kept at the logic "1" level. An AND gate 59 is connected between the terminal Q of the first F/F 56 and the terminal CK of the second F/F 57. The busy signal BSY is given to the terminal CK of the third F/F 58 and to the AND gate 59 through a NAND gate 60.

In an initial state, the terminals Q of each of the first through the third F/F's 56, 57, and 58 are kept at the logic "0" level. The terminals R of the first and the second F/F's 56 are given the logic "1" level from the terminal $\overline{Q}$ of the third F/F 58 while the terminal R of the third F/F 58 is given the logic "0" level from the terminal Q of the second F/F 57. This means that the first and the second F/F's 56 and 57 are put into an unlocked state or an enable state while the third F/F 58 is kept locked into a reset state in which no input signal can be received.

Under the circumstances, the K-th selected input packet $PI_{SK}$ is successively stored in the output buffer memory 50 and is given to the terminal CK of the first F/F 56. The first F/F 56 supplies the logic "1" level from the terminal Q of the first F/F 56 to the output buffer memory 50 as a packet reception signal REC representative of reception of the K-th selected input packet $PI_{SK}$.

Simultaneously, the packet reception signal REC is delivered as the set signal $SET_K$ to the decoding module 43 illustrated in FIG. 6. Thus, the set signal $SET_K$ is produced when the K-th selected input packet $PI_{SK}$ is received at the K-th output buffer $46_K$.

Production of the packet reception signal REC makes the second F/F 57 produce the logic "1" level as a transmission control signal $C_K$ through the terminal Q thereof. This is because the AND gate 59 is enabled by the NAND gate when the busy signal BSY takes the logic "0" level. As a result, the transmission control signal $C_K$ is sent through the K-th output port to the succeeding router circuit, like the transmission control circuit $C_J$ illustrated in conjunction with FIGS. 2 and 3.

The logic "1" level is given from the terminal Q of the second F/F 57 to the terminal R of the third F/F 58. Therefore, the third F/F 58 is changed from the locked state into the unlocked state in which the busy signal BSY can be received from the succeeding router unit.

In this event, the K-th selected input packet stored in the output buffer memory 50 is successively delivered to the K-th output port as the K-th output packet $PO_K$.

Supplied with the busy signal BSY from the succeeding router unit, the third F/F 58 is put into the set state. At the same time, the logic "0" level is sent from the terminal $\bar{Q}$ of the third F/F 58 to the terminals R of the first and the second F/F's 56 and 57. The first and the second F/F's 56 and 57 are therefore rendered into the reset state. Subsequently, the third F/F 58 is put into the reset state by the logic "0" level supplied from the second F/F 57. Thus, the first through the third F/F's 56 to 58 are returned back to the initial state.

With the output buffer memory 50, it is possible to memorize the next following selected input packet even when the busy signal BSY is sent from the succeeding router unit to the output buffer 46 illustrated in FIG. 7. Accordingly, conflicts can be avoided by provision of each output buffer when a plurality of the selected input packets are concurrently supplied to each output buffer.

Figure 8:
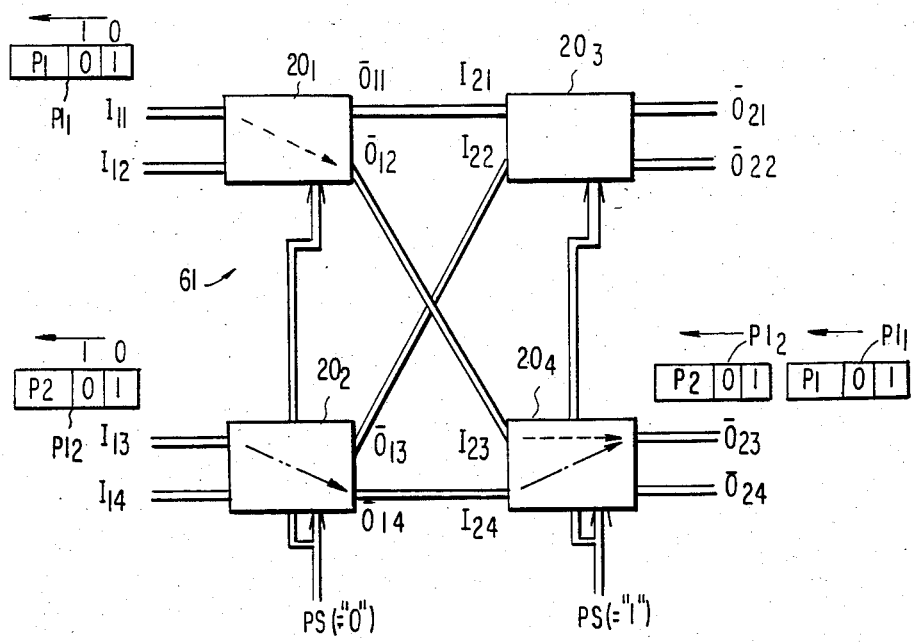
FIG. 8 shows a block diagram of a routing network comprising a plurality of the router units illustrated in conjunction with FIGS. 1 through 7.

Referring to FIG. 8, a routing network is divided into a first partial stage, namely, a preceding stage 61 and a second partial stage 62, namely, the succeeding stage. The preceding stage comprises first and second router units which are depicted at $20_1$ and $20_2$ and each of which is similar to that illustrated in conjunction with FIGS. 1 through 7. The first and the second router units $20_1$ and $20_2$ may collectivley be called a first set of the router units. Likewise, the succeeding stage 62 comprises third and fourth router units $20_3$ and $20_4$ similar to that illustrated in FIGS. 1 to 7. The third and the fourth router units $20_3$ and $20_4$ may be called a second set of the router units.

The first router unit $20_1$ has first and second preceding input ports $I_{11}$ and $I_{12}$ and first and second preceding output ports $0_{11}$ and $0_{12}$ while the second router unit $20_2$, third and fourth preceding input ports $I_{13}$ and $I_{14}$ and third and fourth preceding output ports $0_{13}$ and $0_{14}$. On the other hand, the third router unit $20_3$ has first and second succeeding input ports $I_{21}$ and $I_{22}$ and first and second succeeding output ports $0_{21}$ and $0_{22}$. Likewise, the fourth router unit $20_4$ has third and fourth succeeding input ports $I_{23}$ and $I_{24}$ and third and fourth succeeding output ports $0_{23}$ and $0_{24}$.

It is assumed that a first packet depicted at $PI_1$ is delivered from the first preceding input port $I_{11}$ to the third succeeding output port $0_{23}$ and that a second packet depicted at $PI_2$ is simultaneously delivered from the third preceding input port $I_{13}$ to the third succeeding output port $0_{23}$. The first packet $PI_1$ has a first destination bit series specified by zeroth and first bits 0 and 1 and a first data bit series $P_1$ following the first destination bit series. The zeroth and the first bits of the first destination bit series take the logic "1" and the logic "0" levels, respectively, as indicated in the rectangle. The second packet $PI_2$ has a second destination bit series of "1" and "0" arranged at the zeroth and the first bits, respectively. The second destination bit series is accompanied by a second data bit series $P_2$.

The first and the second router units $20_1$ and $20_2$ placed in the preceding stage 61 are supplied with the position signal of "0". The position signal is for specifying the bit series position to be detected by the preceding stage 61. Therefore, the position signal of "0" indicates detection of the zeroth bit.

It may be mentioned here that the first and the second preceding output ports $0_{11}$ and $0_{12}$ are specified by the logic "0" and the logic "1" levels at the zeroth bit position of the first packet $PI_1$ and that the third and the fourth preceding output ports $0_{13}$ and $0_{14}$ are specified by the logic "0" and the logic "1" levels at the zeroth bit position.

Likewise, the third and the fourth router units $20_3$ and $20_4$ placed in the succeeding stage 62 are supplied with the position signal of "1" indicative of the first bit position of each packet given to the succeeding stage, namely, the second partial stage 62. Each packet is delivered to the first or the third succeeding output port $0_{21}$ or $0_{23}$ when the first bit of each packet takes the logic "0" level. On the other hand, each packet is delivered to the second or the fourth succeeding output port $0_{22}$ or $0_{24}$ when the first bit of each packet takes the logic "1" level.

Supplied with the first packet $PI_1$ through the first preceding input port $I_{11}$, the first router unit $20_1$ detects the zeroth bit position of the first packet $PI_1$ in compliance with the position signal of "0" and delivers the first packet $PI_1$ to the second preceding output port $0_{12}$ because the first packet $PI_1$ has the logic "1" level at the zeroth bit position. The first packet $PI_1$ is sent from the second output port $0_{12}$ to the third succeeding input port $I_{23}$ of the fourth router unit $20_4$.

The fourth router unit $20_4$ monitors the first bit position of the first packet $PI_1$ and assigns the first packet $PI_1$ to the third succeeding output port $0_{23}$ because the first packet $PI_1$ has the logic "0" level at the first bit position.

Similarly, the second packet $PI_2$ is assigned to the fourth preceding output port $0_{14}$ as a result of supervision of the zeroth bit of the second packet $PI_2$. Thereafter, the second packet $PI_2$ is delivered to the third succeeding output port $0_{23}$ because the second packet $PI_2$ has the logic "0" level at the first bit position thereof.

Thus, the second packet $PI_2$ may be sent to the fourth router unit $20_4$ simultaneously with the first packet $PI_1$. However, no conflict takes place in the fourth router unit $20_4$ because the order of the first and the second packets $PI_1$ and $PI_2$ are controlled by each arbiter included in the fourth router unit $20_4$ and each of the first and the second packets $PI_1$ and $PI_2$ is stored in the output buffer. This applies to any other router units.

As mentioned above, decentralized operation is carried out in each router unit to select each output port.

Figure 9:
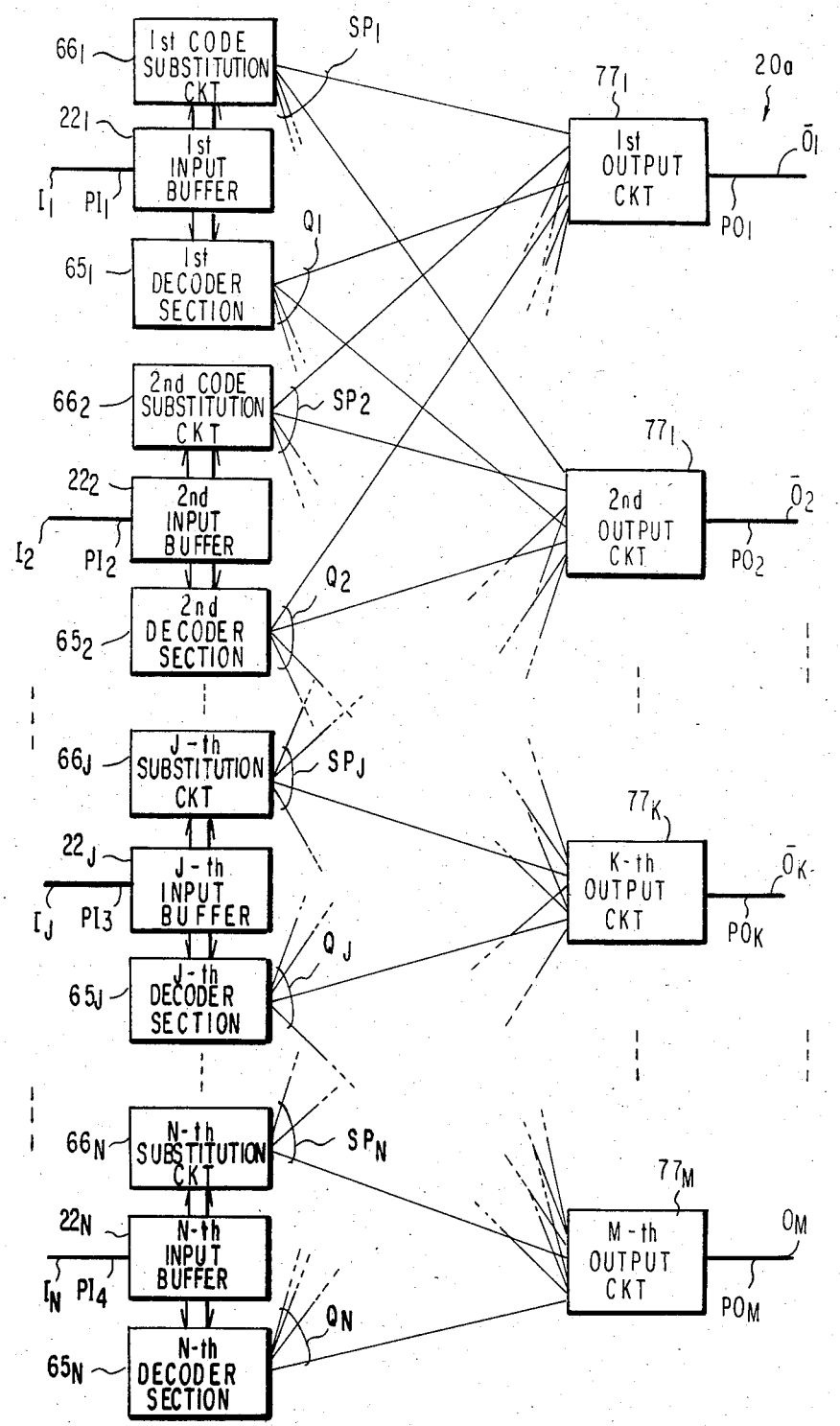
FIG. 9 shows a block diagram of a router unit according to a second embodiment of this invention.

Referring to FIG. 9, a router unit $20_a$ according to a second embodiment of this invention comprises first through N-th input ports $I_1$ to $I_N$ and first through M-th output ports $0_1$ to $0_M$, like the router unit 20 illustrated with reference to FIG. 1. First through N-th input packets $PI_1$ to $PI_N$ are supplied through the first to the N-th input ports $I_1$ to $I_N$ to first through N-th input buffers $22_1$ to $22_N$ in the manner similar to those illustrated in conjunction with FIGS. 1 and 2, respectively. The first through the N-th output ports $0_1$ to $0_N$ produce first through M-th output packets $PO_1$ to $PO_M$, respectively.

The first through the N-th input packets $PI_1$ to $PI_N$ are sent through the first to the N-th input buffers $22_1$ to $22_N$ to first through N-th decoder sections $65_1$ to $65_N$, respectively. Each of the first through the N-th decoder sections $65_1$ to $65_N$ is substantially equivalent to a combination of the selector 32 illustrated in FIG. 4 and the decoder 36 illustrated in FIG. 5.

Figure 10:
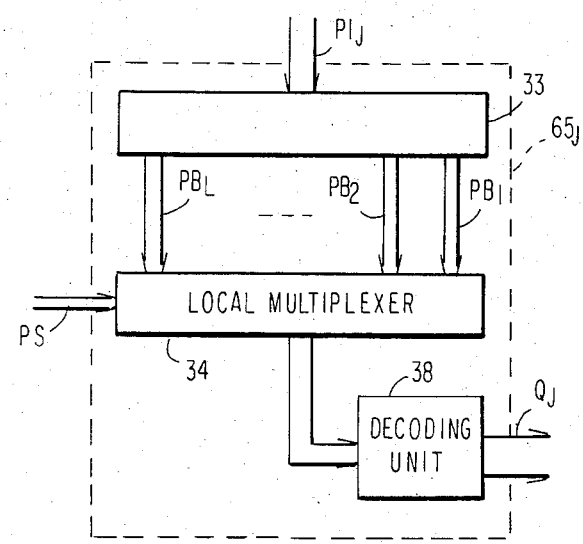
FIG. 10 shows a block diagram of a decoder section for use in the router unit illustrated in FIG. 9.

Referring to FIG. 10, a J-th decoder section $65_J$ is representative of the first through the N-th decoders $65_1$ to $65_N$. The decoder section $65_J$ comprises a register 33 for storing a J-th one $PI_J$ of the input packets to produce first through L-th partial bit series $PB_1$ to $PB_L$. Each of the first through the L-th partial bit series $PB_1$ to $PB_L$ may be of a single bit and is specified by bit series positions, respectively. As is the case with FIG. 4, the first through the L-th partial bit series $PB_1$ to $PB_L$ are sent to a local multiplexer 34 responsive to a position signal PS indicative of a predetermined one of the bit series positions that is preassigned to the router unit $20_a$. The position signal PS is given to the local multiplexer 34 in the manner described in conjunction with FIG. 1. Responsive to the position signal PS, the local multiplexer 34 selects one of the first through the L-th partial bit series to send the one partial bit series to a decoding unit 38. The one parital bit series is decoded by the decoding unit 38 into a request signal $Q_J$. The request signal $Q_J$ specifies one of the output ports $0_1$ to $0_M$ and may therefore be called an output port signal.

Referring back to FIG. 9, the first through the N-th input packets $PI_1$ to $PI_N$ are also sent to first through N-th code substitution circuits $66_1$ to $66_N$ through the first to the N-th input buffers $21_1$ to $21_N$, respectively. By way of example, a J-th code substitution circuit $66_J$ will presently be described in detail. However, similar operation is carried out in any other code substitution circuits.

Figure 11:
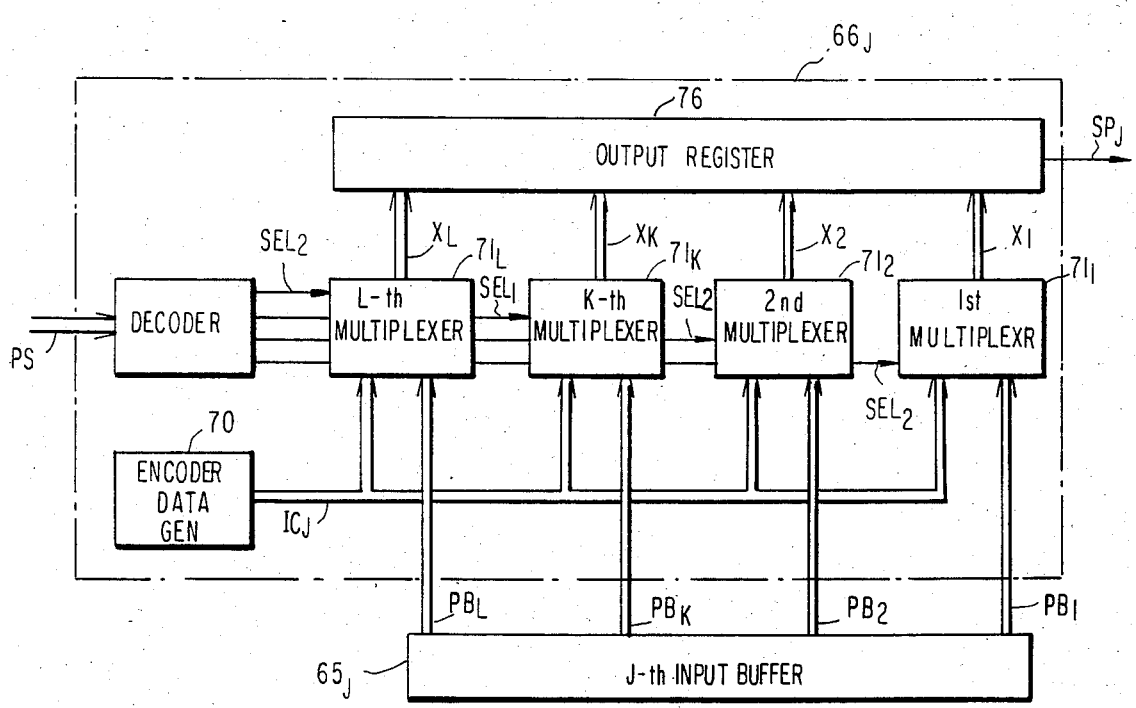
FIG. 11 shows a block diagram of a code substitution circuit for use in the router unit illustrated in FIG. 9, together with an input buffer illustrated in FIG. 9.

Referring to FIG. 11 the J-th code substitution circuit $66_J$ comprises a code generator 70 for generating a input port code $IC_J$ assigned to the J-th input port. In FIG. 9, the illustrated router unit $20_a$ has the first through the N-th input ports $I_1$ to $I_N$. In order to specify the respective input ports $I_1$ to $I_N$, N sorts of input port codes are produced by the first through the N-th code substitution circuits $66_1$ to $66_N$. For example, let N be equal to four. In this event, four of the input ports can be specified by four sorts of input port codes, such as "00," "01," "10," and "11."

In FIG. 11, the J-th code substitution circuit $66_J$ is supplied with the first through the L-th partial bit series $PB_1$ to $PB_L$ from the J-th input buffer $65_J$. A K-th partial bit series $PB_K$ is included in the partial bit series. In addition, the J-th code substitution circuit $66_J$ is supplied with the position signal PS indicative of the predetermined bit series position, as is the case with the J-th decoder section $65_J$. It is assumed that a K-th bit series position is indicated as the predetermined bit series position by the position signal PS.

The first through the L-th partial bit series $PB_1$ to $PB_L$ are delivered to first through L-th multiplexers $71_1$ to $71_L$ to which the input port code $IC_J$ is given, repectively. A K-th multiplexer $72_K$ of the first thorugh the L-th multiplexers $71_1$ to $71_L$ is supplied with the K-th partial bit series $PB_K$ and the input port code $IC_J$.

The position signal PS is decoded by a decoder 74 to select one of the first through the L-th multiplexers $71_1$ to $71_L$, namely, the K-th multiplexer $71_K$. For this purpose, the decoder 74 supplies the K-th multiplexer $70_K$ with a first selection signal $SEL_1$ indicative of selection of the input port code $IC_J$ instead of the K-th partial bit series. On the other hand, each of the remaining multiplexers is supplied with a second selection signal $SEL_2$ indicative of selection of each partial bit series.

As a result, the K-th multiplexer $70_K$ produces as an output code $X_K$ the input port code $IC_J$ substituted for the K-th partial bit series while the remaining multiplexers produces as the remaining output codes the remaining partial bit series, respectively. The remaining output codes are represented by $X_1, X_2, \ldots, X_L$.

The respective output codes $X_1, X_2, \ldots, X_K, \ldots, X_L$ are memorized in an output register 76 to be prouded as a J-th substituted input packet $SP_J$.

In FIG. 9, the J-th code substitution circuit $66_J$ is connected to first through M-th output circuits $77_1$ to $77_M$ and delivers the J-th substituted input packet $SP_J$ to the respective output circuits $77_1$ to $77_M$. The J-th decoder section $65_J$ is also connected to the first through the M-th output circuits $77_1$ to $77_M$. However, the J-th request signal, namely, the output port signal is delivered to one of the first through the M-th output circuits $77_1$ to $77_M$ alone, as described with reference to FIG. 10.

Likewise, each of the remaining code substitution circuits delivers each of the remaining substituted input packets, such as $SP_1$, $SP_2$, and $SP_N$, to the first through the M-th output circuits $77_1$ to $77_M$. Each of the remaining request signals, such as $Q_1, Q_2, \ldots, Q_N$, is given to a selected one of the output circuits $77_1$ to $77_M$.

Figure 12:
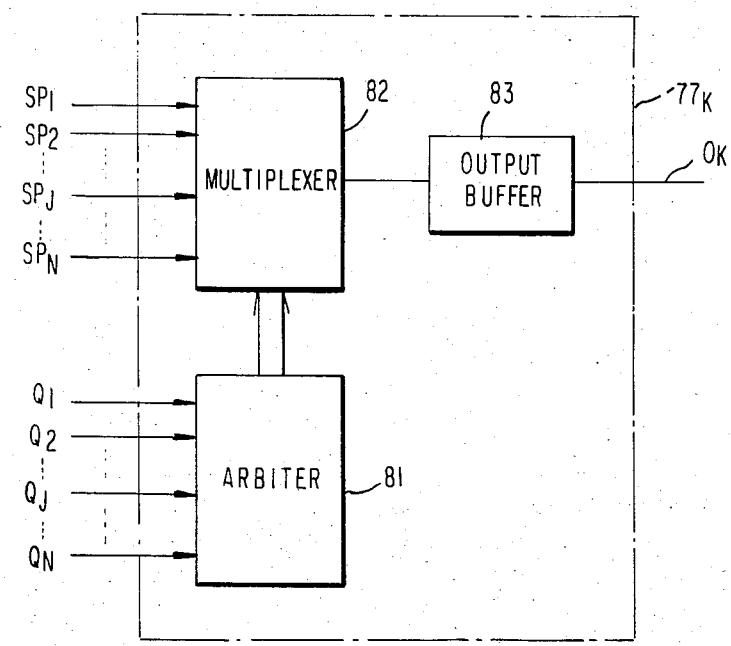
FIG. 12 shows a block diagram of an output circuit for use in the router unit illustrated in FIG. 9.

Referring to FIG. 12 together with FIG. 9, a K-th output circuit $77_K$ is typical of the first through the M-th output circuits $77_1$ to $77_M$. The first through the N-th request signals Q to $Q_N$, $Q_J$ inclusive, are supplied with an arbiter 81 included in the K-th output circuit $77_K$. The arbiter 81 is equivalent in structure to that illustrated in conjunction with FIG. 6 and is therefore not described any longer. Any any rate, one of the request signals $Q_1$ to $Q_N$ is selected by the arbiter 81 to be supplied to a multiplexer 82. Stated otherwise, the one request signal alone is allowed to pass through the arbiter 81 and may therefore be referred to as an allowed output port signal. Herein, let the J-th request signal $Q_J$ be selected by the arbiter 81 and be sent to the multiplexer 82 as the allowed output port signal.

Supplied with the first through the N-th substituted input packets $SP_1$ to $SP_N$, the multiplexer 82 selects the J-th substituted input packet $SP_J$ in response to the allowed output port signal. The J-th substituted input packet $SP_J$ selected by the multiplexer 82 is given to a K-th output buffer 83 similar in structure to that illustrated with reference to FIG. 7. Therefore, the output buffer 83 can successively memorize the substituted input packets $SP_J$ to produce each substituted input packet $SP_J$ as the K-th output packet $0_K$ even when the busy signal BSY is sent from the succeeding router unit to the output buffer 83. Thus, any conflict does not take place in the router unit $20_a$.

With the router unit $20_a$, the substituted input packets are sent to the respective output ports $0_1$ to $0_N$. This means that each input port of the substituted input packets can be detected by the succeeding router unit by monitoring each input port code.

Figure 13:
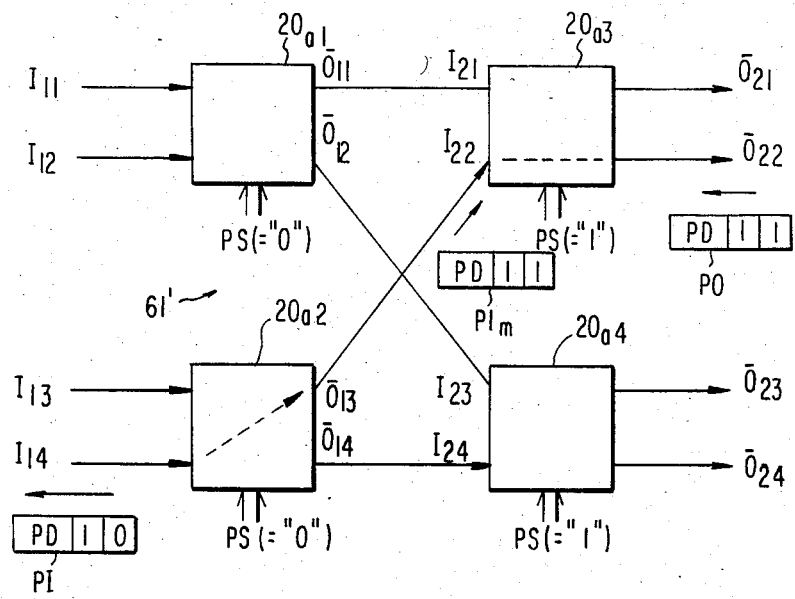
FIG. 13 shows a block diagram of a routing network comprising a plurality of the router units illustrated in FIG. 9.

Referring to FIG. 13, a routing network comprises four of the router units (depicted at $20_{a1}$, $20_{a2}$, $20_{a3}$, and $20_{a4}$) which are illustrated with reference to FIGS. 9 through 12 and which will be called first, second, third, and fourth router units, respectively. The first and the second router units $20_{a1}$ and $20_{a2}$ are arranged in a preceding stage, namely, a first partial stage 61'' while the third and the fourth router units $20_{a3}$ and $20_{a4}$ are arranged in the succeeding stage, namely, a second partial stage 62'.

In FIG. 13, input and output ports and position signals PS equivalent to those illustrated in conjunction with FIG. 8 are represented by like reference symbols, respectively. Each of the first through the fourth router units $20_{a1}$ to $20_{a4}$ is therefore responsive to two input packets for producing two output packets, as are the cases with the first through the fourth router units $20_1$ to $20_4$ illustrated in FIG. 8. In addition, each of the first and the second router units $20_{a1}$ and $20_{a2}$ in the preceding stage 61' monitors the zeroth bit position of each input packet in response to the position signal PS of "0" while each of the third and the fourth router units $20_{a3}$ and $20_{a4}$ monitors the first bit position of each input packet in response to the position signal PS of "1," like in FIG. 8.

The first and the second router units $20_{a1}$ and $20_{a2}$ carry out distribution to the first and the third preceding output ports $0_{11}$ and $0_{13}$, respectively, when the zeroth bit takes the logic "0" level. Otherwise, the first and the second router units $20_{a1}$ and $20_{a2}$ make delivery to the second and the fourth preceding output ports $0_{12}$ and $0_{14}$, respectively.

Likewise, each input packet is delivered from the first and the third succeeding output ports $0_{21}$ and $0_{23}$ when the first bit takes the logic "0" level. Otherwise, each input packet is delivered from the second and the fourth succeeding output ports $0_{22}$ and $0_{24}$.

Moreover, first, second, third, and fourth input port codes are assigned to the first through the fourth preceding input ports $I_{11}$, $I_{12}$, $I_{21}$, and $I_{22}$, respectively, and are assumed to be represented by "00," "01," "10," and "11," respectively.

Let an input packet PI (as shown in FIG. 13) be given to the second router unit $20_{a2}$ through the fourth preceding input port $I_{14}$. The illustrated input packet PI has a destination bit series of "01" divisible into the zeroth and the first bit positions, respectively, and a data bit series PD following the destination bit series. As readily understood from the destination bit series of "01," the input packet PI is to be distributed to the second succeeding output port $0_{22}$.

More particularly, the second router unit $20_{a2}$ sends the input packet from the fourth input port $I_{14}$ to the third preceding output port $0_{13}$ as a result of detection of the logic "0" level placed at the zeroth bit position. In this event, the input port code is substituted for the logic "0" level of the zeroth bit in the second router unit $20_{a2}$ in the above-mentioned manner. Inasmuch as the input port code is specified by a signle bit of the logic "1" level, the input packet PI is modified into a preceding output packet $PI_m$ having a destination bit series of "11." The preceding output packet $PI_m$ is supplied through the second succeeding input port $I_{22}$ to the third router unit $20_{a3}$.

The third router unit $20_{a3}$ sends the preceding output packet $PI_m$ to the second succeeding output port $0_{22}$ because the preceding output packet $PI_m$ has the logic "1" level at the first bit position. In this event, the input port code is substituted for the first bit of the preceding output packet $PI_m$. Thus, the preceding output packet $PI_m$ is modified into a succeeding output packet PO illustrated in FIG. 13. Inasmuch as the input port code of "1" is assigned to the second succeeding input port $I_{24}$ and is identical with the logic "1" level at the first bit position of the preceding output packet $PI_m$, the succeeding output packet PO is not apparently changed from the preceding output packet $PI_m$. However, the logic "1" level at the first bit position specifies the second succeeding input port $I_{22}$.

Thus, the zeroth and the first bits of the succeeding output packets take a pattern of "11" and shows that the succeeding output packet PO comes from the fourth input port.

With the routing system, a part of each packet is used to indicate an output port to which each packet is delivered and is replaced by an input port code assigned to each input port. Therefore, selection of each output port is individually carried out in each router unit. In other words, decentralized operation is possible in each router unit. In addition, it is possible to detect an originating input port on a receiving side of a packet.

While this invention has thus far been described in conjunction with a few preferred embodiments thereof, it will readily be possible for those skilled in the art to put this invention into practice in various manners. For example, this invention is applicable to a system other than the multiprocessor system. In FIG. 11, the substitution circuit may comprise a decoder for decoding the substituted input packet to deliver the same to one of the output circuits.

What is claimed is:

1. A router unit for use in a routing network to respond to a plurality of input packets supplied through a plurality of input ports, respectively, and to distribute said input packets to at least one of a plurality of output ports as output packets, each of said input packets including destination bit series representative of a destination and being divisible into a plurality of partial bit series placed at bit series positions, respectively, said router unit comprising:

first means for producing a position signal indicative of a predetermined one of said bit series positions that is preassigned to said router unit as a function of the position of said router unit in said routing network;

a plurality of second means coupled to respective input ports and said first means for selecting predetermined ones of the bit positions from the respective input packets in response to said position signal to derive predetermined ones of said partial bit series corresponding to said predetermined bit positions from said destination bit series; and third means coupled to the respective second means and the respective output ports and responsive to the respective input packets for selecting said at least one output port with reference to said predetermiend ones of the partial bit series selected by said second means so as to deliver each of said input packets as said output packets to said at least one output port selected by said third means.

2. A router unit as claimed in claim 1, wherein said third means comprises:
a plurality of decoding means, each being coupled to the respective second means for decoding each of the predetermined partial bit series into an output port signal specifying each of said output ports to which the input packet is to be delivered;
a plurality of arbiters, each being coupled to the respective decoding means and being capable of responding to at least one output port signal for allowing only one output port signal to pass therethrough as an allowed output port signal; and
a plurality of delivery means, each being responsive to the respective input packets and said allowed output port signal for delivering one of said input packets as one of said output packets to the output port that is indicated by said allowed output port signal.

3. A router unit as claimed in claim 2, therein each of said delivering means comprises:
selecting means responsive to the respective input packets and said allowed output port signal for selecting said one input packet with reference to said allowed output port signal; and
supplying means for supplying said one input packet to the output port as said one output packet.

4. A router unit as claimed in claim 1, wherein said third means comprises:
a plurality of code generating means for generating a plurality of codes which are assigned to the respective input ports;
a plurality of substituting means coupled to the respective code generating means and responsive to the respective input packets and said position signal for substituting the respective codes for the respective predetermined partial bit series to produce substituted input packets in which the respective codes are substituted for the predetermined partial bit series; and
a plurality of output means, each being coupled to the respective secodn means and the respective substituting means for delivering one of said substituted input packets as one of said output packet to the output port with reference to each of the predetermined partial bit series.

5. A routing network comprising a first partial network and a second partial network which are coupled together, said first partial network comprising a first set of router units, each being responsive to a first set of input packets supplied through a first set of input ports, respectively, for distributing said input packets of said first set to a first set of output ports as a first set of output packets, each of said input packets of said first set including a destination bit series representative of a destination and divisible into a plurality of partial bit series placed at bit series positions, respectively, said second partial network comprising a second set of router units, each being responsive to a second set of input packets supplied through a second set of input ports, respectively, for distributing said second set of said input packets to a second set of output ports as a second set of output packets, said output packets of said first set being supplied to said second partial network as said input packets of said second set, the output ports of the first set in each of the first set router units being connected to the input ports of different ones of the second set router units;
each of the router units of said first set comprising:
means for producing a first position signal indicative of a first one of said bit series positions that is preassigned to said each router unit of said first set;
means responsive to the input packets of said first set and said first position signal for selecting first ones of the partial bit series from said first bit series position; and
first delivering means responsive to said first set of said input packets and said first partial bit series for delivering the input packets of said first set to the output ports of said first set as the output packets of said first set;
each of said router units of said second set comprising:
means for producing a second position signal indicative of a second one of said bit series positions that is preassigned to said each router unit of said second set and that is different from said first bit series position;
means responsive to the input packets of said second set and said second position signal for selecting second ones of the partial bit series from said second bit series position; and
second delivering means responsive to the input packets of said second set and said second partial bit series for delivering the input packets of said second set to the output ports of said second set as the output packets of said second set.

6. A routing network as claimed in claim 5, wherein:
said first delivering means comprises:
first code generating means for generating a first set of first codes assigned to the input ports of said first set;
first code substituting means responsive to said first codes, the input packets of said first set, and said first position signal for substituting said first codes for said first partial bit series to produce first substituted input packets having said first codes substituted for said first partial bit series; and
first output means responsive to said first partial bit series for delivering said first substituted input packets to the output ports of said first set as the output packets of said first set;
said second delivering means comprising:
second code generating means for generating a second set of second codes assigned to the input ports of said second set;
second code substituting means responsive to said second codes, the input packets of said second set, and said second position signal for substituting said second codes for said second partial bit series to produce second substituted input packets having said second codes substituted for said second partial bit series; and
second output means responsive to said second partial bit series for delivering said second substituted input packets to the output ports of said second set as the output packets of said second set.

* * * * *

UNITED STATES PATENT AND TRADEMARK OFFICE
CERTIFICATE OF CORRECTION

PATENT NO. : 4,638,475
DATED : January 20, 1987
INVENTOR(S) : N. KOIKE

It is certified that error appears in the above-identified patent and that said Letters Patent is hereby corrected as shown below:

Column 4, line 40, Delete "bus" insert --busy--;

Column 9, line 51, Delete "a" and insert --an--;

Column 9, line 63, Delete "PBL" insert --$PB_L$--;

Column 10, line 5, Delete "71to" insert --71 to--;

Column 10, line 6, Delete "$72_k$" insert --$71_k$--, and delete "thorugh" and insert --through--;

Column 10, line 46, Delete "Qto" and insert --$Q_1$ to--;

Column 10, line 50, Delete (first occurrence) "Any" insert --at--;

Column 11, line 14, After "61" delete " " " insert --'--;

UNITED STATES PATENT AND TRADEMARK OFFICE
CERTIFICATE OF CORRECTION

PATENT NO. : 4,638,475

DATED : January 20, 1987

INVENTOR(S) : N. KOIKE

It is certified that error appears in the above-identified patent and that said Letters Patent is hereby corrected as shown below:

Claim 13, line 21, Claim 3 Delete "therein" insert --wherein--;

Claim 13, line 42, Claim 4 Delete "secodn" insert --second--.

Signed and Sealed this

Twenty-second Day of March, 1988

Attest:

DONALD J. QUIGG

Attesting Officer     Commissioner of Patents and Trademarks